United States Patent
Lo et al.

(10) Patent No.: US 7,548,184 B2
(45) Date of Patent: Jun. 16, 2009

(54) METHODS AND APPARATUS FOR PROCESSING DATA FROM MULTIPLE SOURCES

(75) Inventors: Thomas K. Lo, Oro Valley, AZ (US); Ronald O. White, Oro Valley, AZ (US); William J. Schmitt, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/152,287

(22) Filed: Jun. 13, 2005

(65) Prior Publication Data

US 2009/0115654 A1    May 7, 2009

(51) Int. Cl.
*G01S 13/86* (2006.01)
*G06G 1/00* (2006.01)
(52) U.S. Cl. .......................... 342/62; 342/52; 244/3.15
(58) Field of Classification Search ............. 342/52–54, 342/62, 67; 244/3.1, 3.15, 3.16, 3.19
See application file for complete search history.

(56) References Cited

U.S. PATENT DOCUMENTS

| | | | | |
|---|---|---|---|---|
| 4,760,397 A | * | 7/1988 | Piccolruaz | 342/75 |
| 5,341,143 A | * | 8/1994 | Reis et al. | 342/64 |
| 5,631,653 A | * | 5/1997 | Reedy | 342/62 |
| 6,042,050 A | * | 3/2000 | Sims et al. | 244/3.17 |
| 6,072,889 A | * | 6/2000 | Deaett et al. | 382/103 |
| 6,260,759 B1 | * | 7/2001 | Nguyen et al. | 235/411 |
| 6,322,216 B1 | * | 11/2001 | Yee et al. | 351/210 |
| 6,596,976 B2 | * | 7/2003 | Lin et al. | 244/3.2 |

FOREIGN PATENT DOCUMENTS

GB   2136097 A   *  9/1984

* cited by examiner

*Primary Examiner*—Thomas G Black
*Assistant Examiner*—Shelley Chen
(74) *Attorney, Agent, or Firm*—The Noblitt Group, PLLC (57) ABSTRACT

Methods and apparatus for processing data from multiple sources according to various aspects of the present invention include a sensing system for determining target information. The sensing system includes sensors to generate target information and local trackers to receive the target information from the sensors. The local trackers may generate local target data for the target, and a combiner connected to the local trackers may use the local target data to generate global data for the target.

30 Claims, 5 Drawing Sheets

METHODS AND APPARATUS FOR PROCESSING DATA FROM MULTIPLE SOURCES

BACKGROUND OF THE INVENTION

1. Field of the Invention

The invention generally relates to processing data from multiple sources.

2. Background

Systems receiving input from multiple sources must combine the incoming data to make use of the data. For example, autonomously guided missiles may have multiple sensors that detect the target, such as infrared sensors, laser receivers, and radar sensors. The missile guidance system must analyze the data from each of the sensors to identify and track the proper target. Conventional techniques for fusing data from multiple sensors, however, require significant processing power and bandwidth.

Most systems using multiple sensors use a form of data fusion to analyze the incoming data. Data fusion systems typically employ either central level fusion or sensor level fusion. In central level fusion, multiple sensors send observations for combination and construction of centralized tracks by a central fusion processor. Sensor level fusion, on the other hand, forms tracks for each sensor, which are then sent to the fusion processor for combination. Both approaches, however, require high throughput and bandwidth to accommodate the large number of detections and tracks that need to be processed and passed from the local sensors to the central fusion processor. Further, the central level fusion approach is sensitive to single sensor failures and countermeasures.

BRIEF SUMMARY OF THE INVENTION

Methods and apparatus for processing data from multiple sources according to various aspects of the present invention include a sensing system for determining target information. The sensing system includes sensors to generate target information and local trackers to receive and process the target information from the sensors. The local trackers may generate local target data on the target, and a combiner connected to the local trackers may use the local target data to generate global data on the target. The local trackers and the combiner may operate asynchronously and/or at different frequencies.

BRIEF DESCRIPTION OF THE DRAWING

A more complete understanding of the present invention may be derived by referring to the detailed description and claims when considered in connection with the figures, wherein like reference numbers refer to similar elements throughout the figures.

DETAILED DESCRIPTION OF EXEMPLARY EMBODIMENTS

The detailed description of exemplary embodiments of the invention makes reference to the accompanying drawing, which shows exemplary embodiments. The description is presented for purposes of illustration only and not of limitation. Other embodiments may be realized, and logical and mechanical changes may be made without departing from the spirit and scope of the invention. The steps recited in any of the method or process descriptions may be executed in any appropriate order and are not limited to the order presented.

The present invention is also described partly in terms of functional components and various methods. Such functional components may be realized by any number of components configured to perform the specified functions and achieve the various results. For example, the present invention may employ various sensors, busses for interfacing components, components for manipulating data, devices for converting signals of one type to another type, devices for transferring data, storage devices for retaining data, algorithms for manipulating data, and the like, which may carry out a variety of functions. In addition, the present invention may be practiced in conjunction with any number of applications, environments, and type of data combined, and the systems described are merely exemplary applications of the invention. Further, the present invention may employ any number of conventional techniques for sensing, transporting data, filtering data, algorithmically manipulating data, and the like.

For the sake of brevity, conventional propulsion systems, guidance systems, processors, sensors, and other functional aspects of the systems (and components of the individual operating components of the systems) may not be described in detail. Furthermore, the connecting lines shown in the various figures are intended to represent exemplary functional relationships and/or physical couplings between the various elements. Many alternative or additional functional relationships or physical connections may be present in a practical system. Various methods and apparatus according to the present invention may be implemented as a customization of an existing system, an add-on system, a software upgrade, a stand alone system, a data processing system, and/or a computer program product. Accordingly, various aspects of the present invention may be implemented entirely in software, entirely in hardware, or a combination of both software and hardware.

Figure 1:
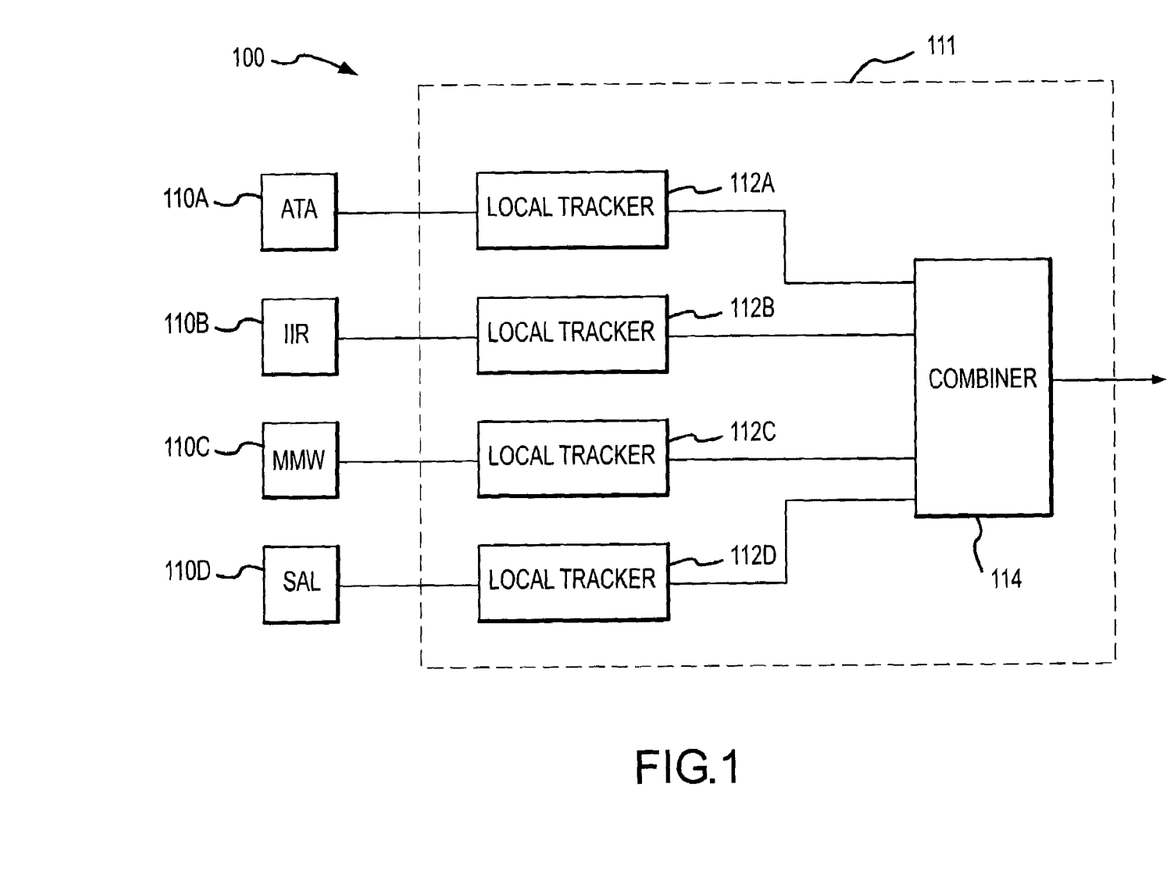
FIG. 1 is a block diagram of a sensing system according to various aspects of the present invention.

Referring to FIG. 1, a sensing system 100 according to various aspects of the present invention comprises one or more sensors 110 and a data processing system 111. The sensors 110 generate sensor data, which are provided to the data processing system 111. The data processing system 111 processes the data from the various sensors 110 to combine the data into useful information.

The sensing system 100 may be used for any suitable purpose or application using multiple sources of data, such as for gathering information, tracking moving targets, and guiding systems toward targets. For example, referring to FIG. 2, the sensing system 100 may be integrated into a missile 200. The missile 200 may comprise any guided system, comprising, for example, a payload 210, a propulsion system 212, and a guidance system 214. The guidance system 214 controls the flight of the missile by controlling flight surfaces 216 to steer the missile 200.

Figure 2:
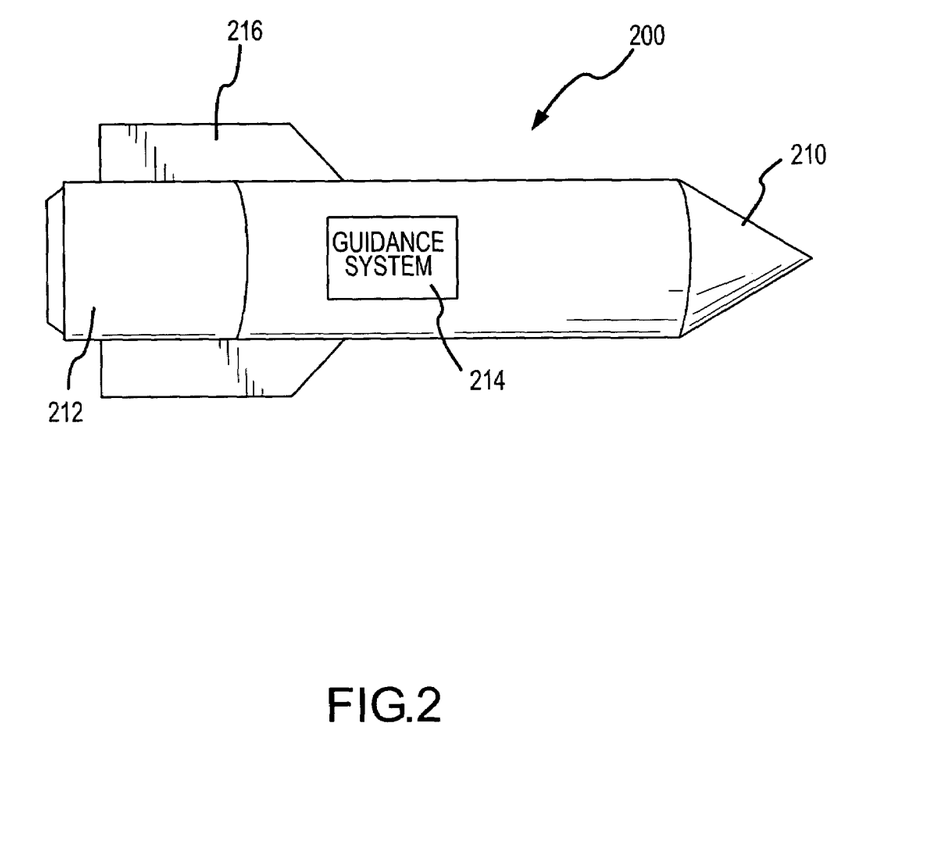
FIG. 2 is an illustration of a missile.

The sensing system 100 is suitably integrated into the guidance system 214 to identify and/or predict the position of a target relative to the missile 200. In one embodiment, the sensing system 100 provides target information for detecting the target and guiding the missile 200 to the target. The data processing system 111 is connected to the sensors in any manner, directly or indirectly, to facilitate communication, including direct wire connection, indirect connection, wireless connection, or any other connection that facilitates communication. The data processing system 111 receives information from the sensors 110 and processes the information to generate a signal to control the flight path of the missile 200 and intercept the target.

More particularly, the sensors 110 receive relevant information relating to a particular condition, target, or other parameter, and provide corresponding information to the data processing system 111. The sensors 110 of the present embodiment provide scene information to the data processing system 111, which generates target position information relating to the location and movement of the target, including location, speed, acceleration, and related vector information. In various applications, the sensors 110 may comprise any suitable data source for providing information to the data processing system 111, such as a system capable of identifying and/or measuring information relating to the target. The sensors 110 may sense any appropriate conditions or signals, for example movement, speed, acceleration, pressure, strain, heat, light, color, chemical composition, electromagnetic waves, magnetic fields, or any other type of physical event or presence capable of being sensed. The sensors 110 may present sensed information to the data processing system 111 in any suitable form and format, such as electrical or optical signals. The sensors 110 may also operate in any appropriate mode, including a continuous mode, sampled mode, analog level mode, discrete level mode, synchronously to other devices such as the data processing system 111, or asynchronously to other devices.

The sensors 110 are suitably adapted to the particular application to sense relevant data. The sensing system 100 of the present embodiment comprises multiple independent sensors 110 operating asynchronously and at different frequencies, and configured to sense data relating to anticipated targets, such as an automatic target acquisition/recognition sensor (ATA) 110A, imaging infrared sensor (IIR) 110B, millimeter wave sensor (MMW) 110C, and semi-active laser sensor (SAL) 110D. In an exemplary system, the sensors 110 are mounted on the missile 200, although one or more sensors may be remote from the missile 200. Each sensor 110 may use a different coordinate system and/or reference point for delivering data detected, measured, and/or reported by the sensor 110. In the present embodiment, the various sensors 110 use different coordinate systems and reference points or axes to report sensed data.

The data processing system 111 is connected to the sensors, directly or indirectly, to analyze data from the sensors 110 and process the information to generate relevant information, such as an aimpoint for guiding the missile 200. For example, referring to FIG. 1, the data processing system 111 of the present embodiment comprises multiple local trackers 112 receiving information from one or more sensors 110, and a combiner 114 receiving data from the local trackers 112 to combine the data into useful information. Generally, the sensors 110 detect target information and provide corresponding signals to the local trackers 112. Each local tracker 112 analyzes information from at least one sensor and produces a local aimpoint for intercepting the target. The combiner 114 receives the local aimpoints from the local trackers 112 and combines the data, for example to identify a composite global aimpoint for intercepting the target. The data processing system 111 may be implemented using any suitable architecture or systems. For example, the local trackers 112 and the combiner 114 may be implemented using a single processor system, a system using multiple processors, or multiple independent computers. Further, the local trackers may operate at different frequencies, for example according to different operating frequencies of the various sensors 110.

More particularly, the local trackers 112 analyze data from the sensors 110 and generate signals relating to the target. In the present embodiment, each local tracker 112A-D independently receives data from one sensor 110A-D and generates a local aimpoint for guiding the missile 200 to the target. In alternative embodiments, multiple local trackers 112 may receive data from a particular sensor 110, and one local tracker 112 may receive data from multiple sensors 110. The local tracker 112 may process the sensor 110 data independently of data from other sensors 110 or local trackers 112.

Each local tracker 112 may be implemented in any suitable manner, such as in a conventional hardware, software, or combination system for generating target information based on data from the sensor 110. The local trackers 112 may comprise any system for receiving the target position information from the sensor and generating the local aimpoint. In the present embodiment, the local trackers 112 comprise conventional tracking systems for analyzing sensor signals to detect and track the target. Each local tracker 112 is suitably configured to operate as a standalone tracker for its respective sensor 110. Each local tracker 112 performs its tracking function using features unique to its particular measurement. The local trackers 112 may operate synchronously or asynchronously with respect to the various sensors 110, the combiner 114, and/or other devices, and the local trackers 112 may receive data from the sensors 110 at any frequencies, in any formats, and by way of any communication technique. The local tracker 112 may also process the data from the sensor 110 partially or entirely in real-time.

In addition, the local tracker 112 may receive, process, and transmit information in any coordinate system, such as the coordinate system used by the sensor 110, and may operate in conjunction with any reference point. Although both sensors 110A, B may be facing the same direction along the travel path of the missile 200, the reference points or axes of the respective sensors 110A, B are slightly different due to the relative displacement of the sensors' 110A, B lines of sight. Accordingly, the local trackers 112A, B may also process data from different reference points as well, although each local tracker is configured to lock onto the same aimpoint.

To begin tracking, the local tracker 112 may be initialized in any suitable manner using any appropriate data. For example, the local tracker 112 may begin from an initial state independently seeking a target, such as in conjunction with conventional pattern recognition or other target recognition or tracking algorithms. Alternatively, the local tracker may find and begin tracking the target in conjunction with an initial aimpoint position or aimpoint track information, for example retrieved from memory or received from another system, such as the combiner 114 or another local tracker 112.

Operation of the local tracker 112 may be interrupted and/or restarted at any time. Further, an initialization command and/or initialization data may come from any appropriate system or device, such as the combiner 114. In an exemplary embodiment, the combiner 114 may command the local tracker 112 to start or restart operation and may provide initialization data.

Each local tracker 112 may transmit any data received from the sensor 110 and/or generated by the local tracker 112 to any other appropriate device. The transmitted data may comprise any information relevant to the target. The local tracker 112 may also generate related information, such as a local aimpoint for guiding the missile to intercept the target based on the data from the particular sensor 110 providing data to the local tracker 112. Additional data, such as an estimated noise value, a measured noise value, and the time of measurement, may also be generated.

In the present embodiment, the local trackers 112 generate target position data according to data reported by the corresponding sensors 110. Based on the accumulated position data, the local trackers 112 calculate the velocity and acceleration of the target. Each local tracker 112 also calculates the local aimpoint for intercepting the target, which is suitably based on information received from fewer than all of the sensors 110. In the present embodiment, the local tracker 112 generates the local aimpoint based only on the data received from its associated sensor 110. The local tracker 112 may use any type of algorithm or device to produce the local aimpoint. For example, the present local trackers 112 utilize a multiple objects tracker and a recursive data processing algorithm, such as a Kalman filter, to produce the local aimpoint. Each local tracker 112 may also generate an estimated noise value, a measured noise value, a local aimpoint track state, and the time of the measurement.

The local tracker may also provide a local reliability value, which suitably corresponds to a reliability assessment based on information received from the sensor and data generated by or accessible to the local tracker 112. The local reliability value may vary according to the reliability or perceived reliability of the local aimpoint provided by the local tracker 112. For example, each local tracker 112 may generate a local figure of merit (LFOM) indicating the local tracker's 112 confidence in the reliability and/or accuracy of its own local aimpoint. Each local tracker 112 may be configured to determine its LFOM according to an appropriate process and criteria relating to the particular sensor 110, local tracker 112, and the like. The LFOM value may be discrete or continuous and may be of any value.

In the present embodiment, the lowest LFOM value is zero, which is assigned at initialization or any other time when the local tracker 112 is not tracking the target. The local tracker 112 may adjust the LFOM to a higher value, up to unity, when reliably tracking. The local tracker 112 may use any suitable method to determine its LFOM including, for example, tracking an error estimate, measuring the noise affecting the tracking, adjusting for the known precision of the sensor 110, and evaluating data consistency from the sensor 110 over time. For example, each local tracker 112 may compute the LFOM by calculating a difference between the current local aimpoint and a predicted local aimpoint based on the local aimpoint track file.

Each local tracker 112 may use a different range of LFOM values, and the values from the local trackers 112 may also be normalized. For example, the value of an LFOM may be related to the type of sensor 110 feeding position data to the local tracker 112. The value indicating reliable operation for one type of sensor 110 may be higher than the value indicating reliable operation for another type of sensor 110. In the present exemplary embodiment, the ATA sensor 110A is given a higher maximum LFOM than other sensors 110 because it operates using a stored model and is less susceptible to loss of lock from nearby clutter. The IIR sensor 110B may be more accurate and less subject to measurement noise than the MMW 110C sensor. Consequently, the maximum LFOM value the from the IIR local tracker 112B may be higher than the maximum LFOM value of the MMW local tracker 112C. The value of the LFOM may also be influenced by the amount of noise present in the sensing process.

Signals from the local tracker 112 are provided to the combiner 114 for combination with data from other local trackers 112 to generate composite global data. In the present embodiment, each local tracker 112 provides the local aimpoint, the time of measurement, and the LFOM to the combiner 114.

The local target information from each local tracker 112 is provided to the combiner 114, which combines data from multiple sources to form a composite result. The combiner 114 may comprise any system for receiving the local target information from the local trackers and generating the signal for guiding the missile 200. For example, the combiner 114 may receive local target data from the local trackers 112, such as local aimpoints, and combine the local target data to form global target data, such as a global aimpoint, which may then be used to guide the missile 200. Further, the combiner 114 may generate additional data that may affect the guidance of the missile 200, such as a global aimpoint track and a global noise estimate.

In an exemplary embodiment, the combiner 114 receives local target data from each of the local trackers 112 comprising the local aimpoint, the time tag, and the LFOM. The combiner 114 may then process the local tracker 112 target data to generate a global aimpoint for guiding the missile 200, which may comprise an aimpoint for the target based on information from at least one of the local trackers 112. For example, the combiner 114 may transform local target data from each local tracker 112 to a common coordinate system and reference point. The combiner 114 also suitably propagates local target data and the associated covariance with respect to the local tracker's local aimpoint track to a common point in time. Because the combiner 114 may receive only the local aimpoint, the LFOM, and the time tag, and may convert the received data to an acceptable format, the combiner 114 may operate in conjunction with a wide array of conventional local tracking systems. The combiner 114 may then adjust the global aimpoint according to the multiple local aimpoints received from the various local trackers 112.

The combiner 114 may generate the global aimpoint according to any suitable process or algorithm, such as in conjunction with a recursive data processing algorithm, for example using Kalman filtering. The global aimpoint position and global aimpoint track data may be used to guide the missile and/or for any other suitable purpose, such as to initialize a local tracker 112, detect when a local tracker 112 has lost its lock on the target (i.e., no longer accurately tracking the target), and detect when a local tracker 112 is not operating reliably.

The combiner 114 may also adjust the global aimpoint according to the reliability of the data received from the various local trackers 112. For example, the combiner 114 may generate a global reliability value corresponding to a reliability assessment of the local aimpoint based on information received from the sensor 110 and local tracker 112 and data generated by or accessible to the combiner 114, but not the local tracker 112. The global reliability value may vary according to the reliability or perceived reliability of the local aimpoint. In the present embodiment, the global reliability value comprises a Global Figure of Merit (GFOM) for each local tracker 112 and generates a corresponding weight for comparing data from different local trackers 112. The GFOM may be calculated in any suitable manner, such as in conjunction with the LFOM reported by each local tracker 112 and/or a predetermined, static GFOM generated by the combiner 114 for each local tracker 112. The combiner 114 may adjust the global aimpoint position according to the weights assigned to the local aimpoints from the local trackers 112.

In operation, the guidance system 214 guides the missile 200 to its target according to data from the sensors 110. The sensors 110 may generate data corresponding to the sensed environment, such as by scanning an area to detect a target, and feed the data to the data processing system 111 for processing. The local trackers 112 independently generate local data, such as the local aimpoint and the LFOM, based on the particular sensor 110 data. The local data from the various local trackers 112 is transmitted to the combiner 114, which generates global target data, such as a global aimpoint for guiding the missile 200. The global target data may be determined and updated according to any suitable process or technique, including adjusting the global aimpoint according to the local aimpoints received from the local trackers 112. The local target data may be weighted to regulate the influence that the various local target data have on the global target data.

More particularly, to begin tracking a target, the sensing system 100 of the present embodiment is suitably initialized to a known state, for example a predetermined state, the state of an already functioning similar system, or a state based on data from at least one operational sensor 110. In a system having multiple sensors 110, all sensors 110 may not simultaneously start tracking the target. Instead, one sensor 110 may begin tracking the target and the remaining sensors 110 may lock on after the first sensor 110. The sensors 110 not yet operating or tracking the target may be initialized using data from the sensors 110 that are already tracking the target. Using the data from the sensors 110 already tracking the target to initialize the following sensors 110 may expedite tracking for the remaining sensors 110 and ensure that the local trackers 112 are pursuing a common target.

Figure 3:
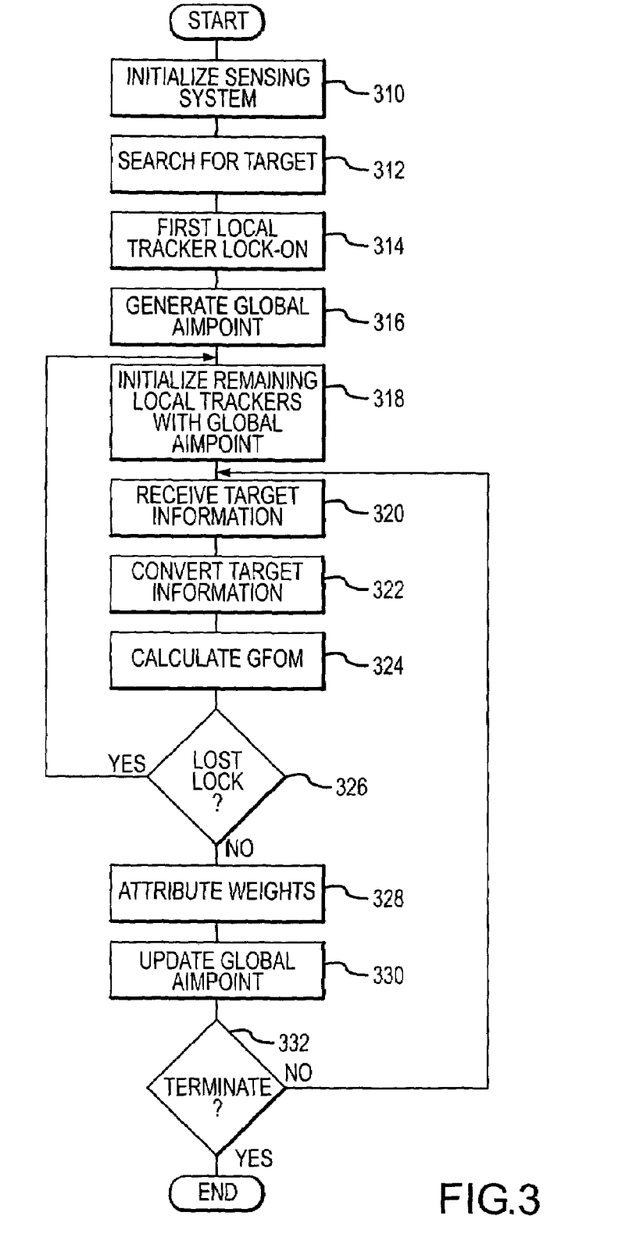
FIG. 3 is a flow diagram of a process for analyzing data from multiple sources.

For example, referring to FIG. 3, at system startup (310), each sensor 110 reports an LFOM of substantially zero because no sensor 110 has locked onto the desired target. Thus, no global aimpoint may be formed. The sensors 110 begin searching for the target (312) and, eventually, at least one sensor 110, such as the ATA sensor 110A, identifies and locks onto the target (314). As a result, the ATA local tracker 112A tracks the target to produce the relevant local target information, such as a local aimpoint and a non-zero LFOM, and transmits the information to the combiner 114. The combiner 114 then initializes the global aimpoint track using the local aimpoint position from the locked-on ATA sensor 10A as the first global aimpoint position (316).

Upon initially establishing the global aimpoint, the combiner 114 may provide the global aimpoint to the other local trackers 112 that have not yet locked onto the target, which may then use the global aimpoint to initialize the sensors 110 and local trackers 112 (318). Thus, each sensor 110 and local tracker 112 begins looking for the target at the global aimpoint, which promotes tracking of a common target by the local tracker 112. As each sensor 110 and local tracker 112 finds and locks onto the target, each local tracker 112 establishes a local aimpoint and LFOM and transmits the local target information to the combiner 114 (320).

When the combiner 114 receives local target information from more than one of the local trackers 112, the combiner 114 may process the local target information to generate the global information. For example, the combiner 114 may process the various local data for conformity to a single global standard that may be used by the combiner 114, such as filtering, smoothing, and normalizing the data, and converting the format of the various local tracker 112 data to a single format (322). In the present embodiment, the combiner 114 may receive local aimpoint data from different local trackers 112 using different coordinate systems, and may convert the local aimpoint data from the various coordinate systems into a single coordinate system. Similarly, because the various sensors 110 may operate from different reference points or axes, the combiner 114 may convert the data from the various local data trackers 112 to a common reference frame. In addition, the combiner 114 may propagate the data to compensate for differences in data rates and reporting times among the various local trackers 112, for example by extrapolating local and/or global aimpoint data, so that the data conforms to a common time frame.

The combiner 114 generates the global aimpoint based on the processed data received from the local trackers 112. For example, the combiner 114 may average the various local aimpoints. Alternatively, the combiner 114 may discard data from one or more local trackers 112, such as data that deviate from an expected aimpoint position or from the data from the other local trackers 112, and generate the global aimpoint based on the remaining local tracker data.

In the present embodiment, the combiner 114 attributes different weights to the data received from the different local trackers 112. The weights may be assigned according to any suitable criteria, such as the perceived reliability of the local data, the amount of noise measured by the sensor 110 and local tracker 112, the typical reliability and/or accuracy of the sensor 110, and/or the difference between the data provided by the local tracker 112 and projected data. Further, the weights are suitably normalized so that the combined weights add up to one to facilitate use of the weights.

The present combiner 114 weights the data from the various local trackers 112 according to the LFOMs received from the local trackers 112. The LFOM corresponds to the reliability of the data estimated by the local tracker 112. Thus, if one LFOM is lower than other LFOMs, the combiner 114 may rely less on the data from the lower LFOM local tracker 112 than other local trackers 112. Conversely, if the LFOM for the local tracker 112 is higher, then the combiner 114 may place greater emphasis on the data.

The combiner 114 may also (or alternatively) rely on other factors to determine the reliability of the data from the various local trackers 112. For example, the combiner 114 may establish a value corresponding to the reliability of the data from each local tracker 112 based on data that may not be available to or recognized by the local tracker 112. The present combiner 114 establishes GFOMs for each local tracker 112, which represent the confidence the combiner 114 has in the accuracy and/or reliability of the data provided by each local tracker 112 (324). The GFOM may operate as an independent check on local tracker 112 and sensor 110 performance.

Any method and/or data may be used to determine the GFOM for each local tracker 112. For example, the combiner 114 may use the LFOM provided by the local tracker 112 as its GFOM. The combiner 114 may adjust the GFOM for a particular local tracker according to its time tag such that reliance on the local tracker decreases with age. The combiner 114 may also compare information from each local tracker 112, or a subset of local trackers 112, to determine the GFOM for a particular local tracker 112. Further, the combiner 114 may compare data from the local tracker 112 to data the combiner 114 maintains or generates to determine a GFOM.

In the present embodiment, the combiner 114 maintains a global aimpoint track corresponding to the changing global aimpoint over time. After converting received local data to a common coordinate system and reference point, the combiner 114 may also propagate the local tracker data to a desired point in time and extrapolate or otherwise propagate the data maintained in the global aimpoint track to the same point in time to produce a predicted aimpoint. In the present embodiment, at a given global aimpoint update, all measurements are transformed into positions in a common coordinate system and then propagated to a position at a common time. The combiner 114 compares the local aimpoint from the local tracker 112 to the corresponding predicted aimpoint from the global aimpoint track. The difference between the local aimpoint and the predicted aimpoint may be an indication of the reliability of the local tracker 112 and may be used to establish the GFOM.

More particularly, the combiner 114 of the present embodiment suitably determines a difference or residual, denoted as "d" below, between the local aimpoint reported by the local tracker 112 and the corresponding global aimpoint or predicted aimpoint at a particular time. The combiner 114 may also calculate or estimate the covariance, denoted as "S" below. The GFOM for the local tracker 112 may be calculated so that the GFOM decreases monotonically with the value of the residual and inversely with the determinant of the covariance of the residual. The GFOM for each of "i" local trackers 112 may be expressed mathematically as given in Equation $$GFOM_i \propto \frac{\exp^{-0.5 d_i^2}}{|S_i|^{1/2}} \qquad \text{Equation 1}$$

Thus, as the value of the residual and/or the covariance increases, the value of the GFOM for the local tracker 112 decreases, indicating the decreased accuracy and/or reliability of the local tracker 112. The GFOM decreases as the aimpoint position reported by a local tracker 112 diverges from the predicted global aimpoint. The GFOM may also include other variables. Thus, the GFOM may be used in assessing the reliability and/or accuracy of the local tracker 112 data.

The combiner 114 may also use the GFOM, as well as the LFOM and any other suitable factors or criteria, to calculate a weight for each local tracker 112 (328). The weight calculated for each local tracker 112 may be used to regulate the influence local aimpoints from the local trackers 112 have on the calculation of the global aimpoint. The weighted data may then be combined to form the global aimpoint (330). If the calculated weight for a particular local tracker 112 is negligible, however, the weighted data may be ignored in updating the global aimpoint. Reducing the weight of an unreliable local tracker 112 decreases the impact unreliable data may have on the accuracy of the global aimpoint, which tends to maintain the accuracy of the global aimpoint even when one or more local trackers 112 and/or sensors 110 may fail or cease to track the desired target. Calculating a weight for each local tracker 112 and applying the weight to data from the local tracker 112 tends to increase system reliability and reduce system vulnerability to sensor 110 failure.

The combiner 114 may use the GFOMs to determine the weights attributed to data received from the local trackers 112 according to any suitable criteria. In the present embodiment, the weight, denoted as "w", for data from each of "i" local trackers 112 is calculated according to both the LFOM and the GFOM for each local tracker 112. For example, the LFOM reported by the local tracker 112 may be multiplied by the GFOM determined by the combiner 114 for the local tracker 112 as shown in Equation 2.

$$w_i = LFOM_i * GFOM_i \qquad \text{Equation 2}$$

The calculated weight may also be normalized, for example by dividing the weight by the sum of all LFOMs and GFOMs. The calculated weight may be used when combining data to decrease the influence of less reliable data on the combined global result. For example, the global aimpoint position, denoted as "x", and global noise, denoted as "σ" (sigma), may be calculated using weighted averages according to Equation 3 and Equation 4.

$$x = \frac{\sum_i w_i x_i}{\sum_i w_i} \qquad \text{Equation 3}$$

$$\sigma^2 = \frac{\sum_i w_i^2 \sigma_i^2}{\left(\sum_i w_i\right)^2} \qquad \text{Equation 4}$$

Thus, data from a local tracker 112 may be deemphasized if the local tracker 112 believes its own performance is inaccurate or unreliable as reflected by a low LFOM, or if the combiner 114 believes a local tracker 112 is inaccurate or unreliable as reflected by a low GFOM.

A low weight may also reflect a condition other than inaccurate/unreliable operation of a local tracker 112. For example, after initialization and/or power up, a local tracker 112 may report its LFOM as substantially zero until the sensor 110 has locked onto a target. Therefore, in an exemplary embodiment, the aimpoint from a local tracker 112 that has not acquired lock has a substantially zero weight and may not used to determine the global aimpoint. A local tracker 112 may also report a substantially zero or low LFOM upon experiencing any type of detectible failure. Therefore, upon failure, the weight for the local tracker 112 may decrease as the LFOM decreases, thus protecting the global aimpoint from corruption.

Weighting may increase accuracy of the global aimpoint and global aimpoint track and decrease the associated noise. Local tracker 112 and sensor 110 data used in the present tactical missile exemplary embodiment may operate in a dynamic environment where aimpoint position measurements may vary from the true measurement due to factors such as motion, acceleration, clutter, device operation, and algorithmic inaccuracies. In an exemplary embodiment, combining weighted aimpoint position data from multiple local trackers 112 enables the combiner 114 to maintain a global aimpoint position that exhibits less noise than the individual aimpoint positions from each local tracker 112. After determining the weighted global aimpoint measurement and the global measurement noise, the combiner 114 uses them to initiate and/or update the global aimpoint track, for example, via Kalman filtering. The process of collecting data from sensors 110, processing the sensor data in each local tracker 112, providing data to the combiner 114, and producing the global aimpoint position and global aimpoint track may repeat as long as desired, for example until approaching or striking the target or otherwise terminating (332).

EXAMPLE

Figure 4:
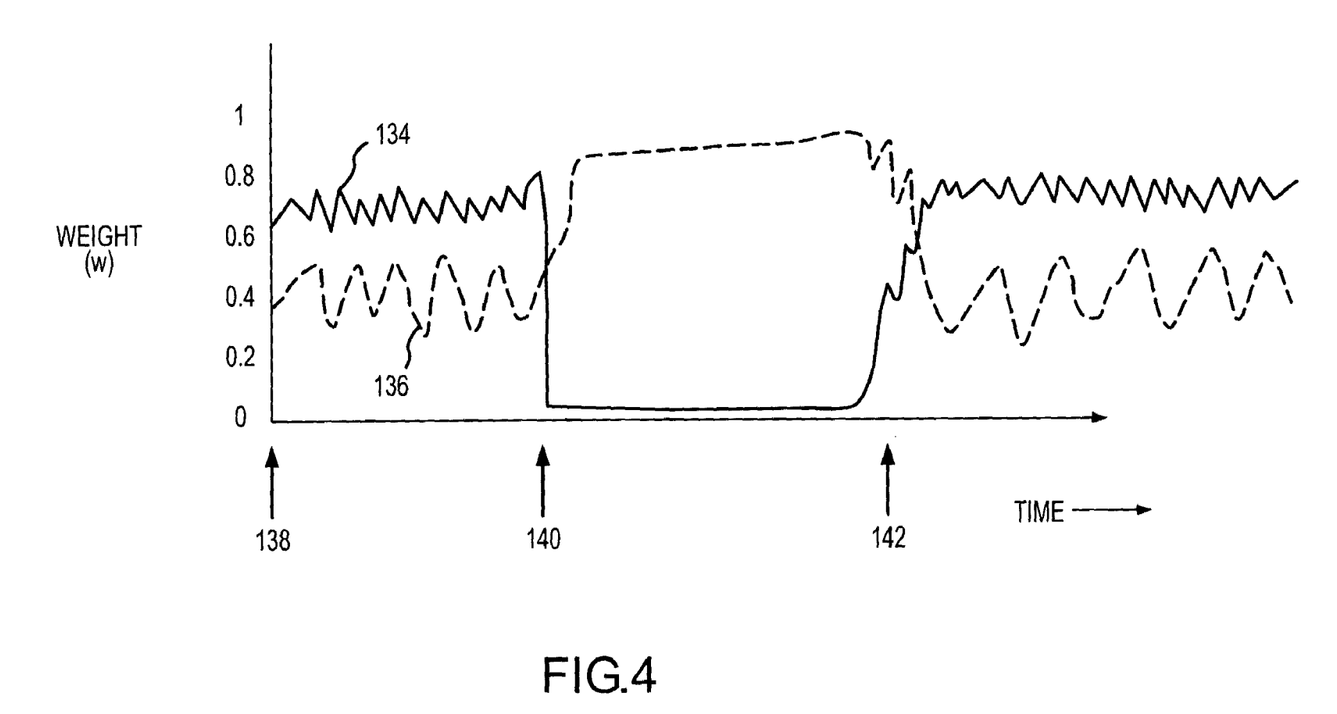
FIG. 4 is signal diagram of weights accorded to data from two sources over time.
Figure 5:
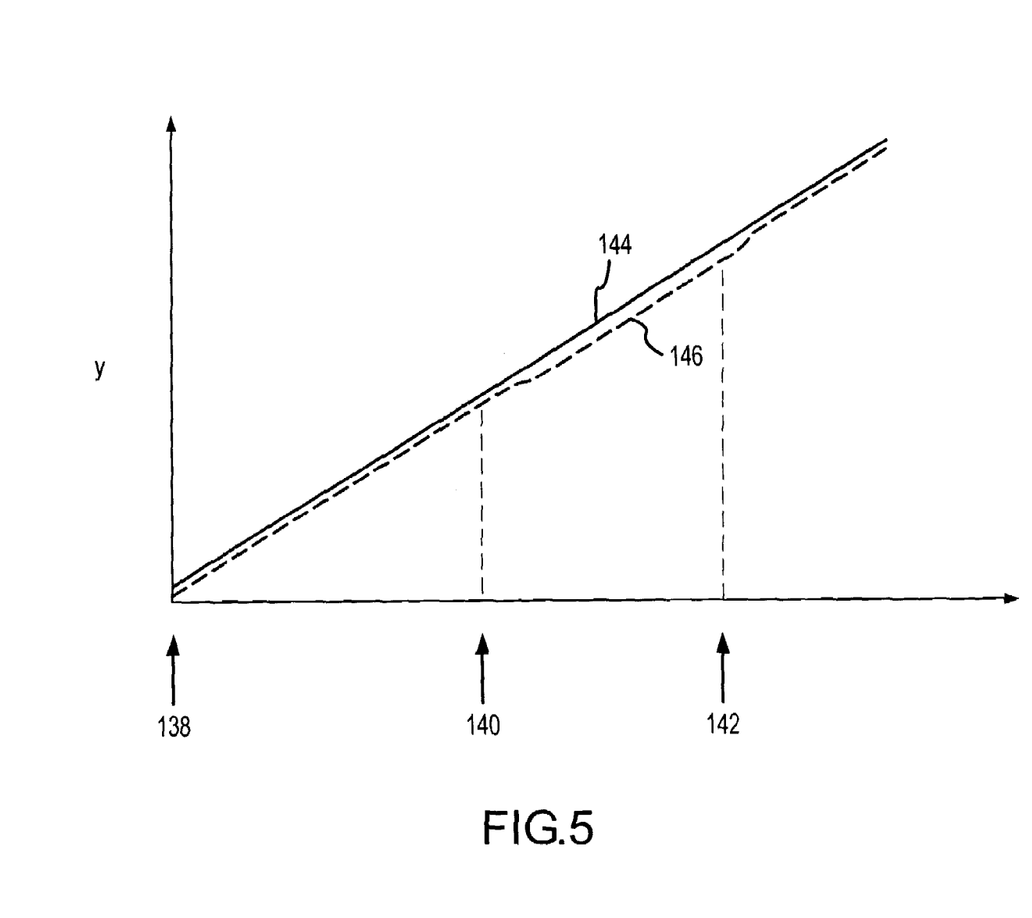
FIG. 5 is a diagram of a global aimpoint with respect to an actual target position over time.

For example, referring to FIGS. 4 and 5, the weights 134, 136 between two instances 138, 140 for two local trackers 112 may depict normal variations of a functional system where two local trackers 112 are locked onto a target and provide the combiner 114 with local aimpoint position data. While both trackers 112 are locked onto the target, a global aimpoint track 146 produced by the combiner 114 closely resembles the actual position track 144 of the target. Variations in each weight may represent noise due to operating conditions of the local tracker 112 and/or sensor 110. The first weight 134 may have a higher value than the second weight 136 for a variety of reasons, for example because of inherent differences between the sensors 110 used by each local tracker 112, local tracker 112 operation, LFOM value, and GFOM value.

At a certain time 140, the first local tracker 112 loses lock on the target. The first local tracker 112 may not realize it has lost lock, so the local tracker's LFOM may remain relatively high. As the local tracker 112 aimpoint position associated with the first weight 134 diverges from the predicted global aimpoint, its GFOM decreases, and the first weight 134 also decreases. The first weight 134 may decrease to substantially zero value.

As the combiner 114 continues to receive aimpoint positions from the second local tracker 112, the second weight 136 for data from second local tracker 112 increases because the global aimpoint position begins to track the positions reported by the second local tracker 112. Consequently, the local aimpoint position for the second local tracker 112 diverges less from the predicted global aimpoint, so the GFOM for the second tracker 112 increases. The weight for the second local tracker 112 may rise as high as a value of one. As a result, the global aimpoint track 146 may become less accurate due to the lower accuracy or reliability of the second local tracker 112 and sensor 110, but continues to track the actual position track 144 of the target.

At a later time 142, the first local tracker 134 reacquires the target or is reinitialized by the combiner 114, and begins providing aimpoint position data to the combiner 114. In time, as the combiner 114 combines the local aimpoint positions, the global aimpoint track 146 more closely approaches the actual target track 144, and the respective weights for both local trackers 112 are adjusted accordingly.

The local trackers 112 and sensors 110 may also be adjusted or reinitialized to improve the reliability and/or accuracy of the local tracker 112 data. Just as a combined value may be used to initialize uninitialized sensors 110, a combined value and/or other data produced during the combining process may be used to reinitialize a sensor 110 that may be in an unknown and/or unlocked state. For example, in an exemplary embodiment, a local tracker 112 and sensor 110 may be searching in the general area of a target, but may lock onto clutter near the target instead of on the target itself.

Loss of lock may be detected in any suitable manner. For example, in the present embodiment, the local tracker 112 may calculate a generalized residual state vector proportional to a difference between the current local aimpoint vector and a predicted aimpoint vector, such as a predicted aimpoint vector based on the local aimpoint track file or the global aimpoint track file. The generalized residual state vector may also be affected by any other suitable factors, such as being inversely proportional to the covariance of the sensor data and/or the local aimpoint track data. The generalized residual state vector may be used to identify a breaklock condition, such as by comparing the generalized residual state vector to a threshold.

A local tracker 112 in an unlocked state may benefit from at least one of the following: being completely reset, initialized with the global aimpoint, and initialized with the global aimpoint track. Completely resetting a local tracker 112 may comprise clearing local aimpoint track information and allowing the sensor 110 and local tracker 112 to search for the target. The local tracker 112 and sensor 110 may alternatively be initialized with the global aimpoint to expedite the initialization process. Moreover, a local tracker 112 may also be in an unlocked state because it is tracking an object close to the desired target, but not the target itself. Under such conditions, initializing the local tracker without resetting its track may help the local tracker 112 to discover and lock onto the desired target. A local tracker 112 may also be tracking an object that may be remote from the target and the local tracker 112 track may reflect serious inaccuracies. A local tracker 112 operating in such a condition may be reinitialized by replacing the local tracker's 112 track with the global aimpoint track.

Reinitialization may be activated in any manner and by any module. For example, reinitialization may be activated by the local tracker 112, sensor 110, and/or combiner 114. In an exemplary embodiment, the combiner 114 may reinitialize a local tracker 112 when the GFOM or weight crosses a threshold and may load the local tracker 112 with the global aimpoint or global aimpoint track to help track the target (326).

Although the description above contains many details, these should not be construed as limiting the scope of the invention but as merely providing illustrations of some of the exemplary embodiments of this invention. The scope of the present invention fully encompasses other embodiments, and the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described exemplary embodiments are expressly incorporated by reference and are intended to be encompassed by the present claims, unless otherwise indicated. Moreover, it is not necessary for a device or method to address each and every problem sought to be solved by the present invention for it to be encompassed by the present claims. Furthermore, no element, component, or method step in the present disclosure is intended to be dedicated to the public regardless of whether the element, component, or method step is explicitly recited in the claims. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described is required for the practice of the invention unless expressly described as "essential" or "critical".

The invention claimed is:

1. A sensing system for determining a target position, comprising:
    at least two sensors configured to generate target position information;
    at least two local trackers connected to the sensors and configured to;
        receive the target position information;
        generate at least two local aimpoints relating to the target; and generate a local reliability value for each of the at least two local aimpoints; and a combiner connected to the local trackers and configured to:
- receive the local aimpoints and generate a global aimpoint for the target;
- generate the global aimpoint according to the local aimpoints and a weight for each local aimpoint, wherein the weight for each local aimpoint is based on the local reliability value for the local aimpoint; and
- generate a global reliability value for each of the local aimpoints, wherein the weight attributed to each local aimpoint is based on the local reliability values and the global reliability values.

2. A sensing system according to claim 1, wherein the global reliability value corresponds to a difference between the local aimpoint and a substantially contemporaneous global aimpoint.

3. A sensing system according to claim 1, wherein the combiner is configured to substantially simultaneously process the local aimpoints to generate the global aimpoint.

4. A sensing system according to claim 1, wherein the combiner is configured to initialize at least one of the local trackers using the global aimpoint.

5. A sensing system according to claim 1, wherein:
- each global reliability value corresponds to a difference between the local aimpoint and a substantially contemporaneous global aimpoint; and
- the combiner is configured to attribute lower influence to the local aimpoint in generating the global aimpoint according to the magnitude of the difference.

6. A sensing system according to claim 1, wherein:
- each global reliability value corresponds to a difference between the local aimpoint and a substantially contemporaneous global aimpoint; and
- the combiner is configured to reset the local tracker if the corresponding difference exceeds a threshold.

7. A sensing system according to claim 1, wherein:
- each local tracker is configured to generate a local reliability value for the local aimpoint and provide the local reliability value to the combiner; and
- the combiner is configured to generate the global aimpoint based only on the local aimpoints, the local reliability values, and the global reliability values.

8. A sensing system according to claim 1, wherein at least one of the local trackers operates asynchronously with respect to at least one of the other local trackers.

9. A sensing system according to claim 1, wherein at least one of the local trackers uses a different coordinate system than at least one of the other local trackers.

10. A sensing system according to claim 1, wherein at least one of the local trackers uses a different reference axis than at least one of the other local trackers.

11. A missile having a guidance system for tracking a target, comprising:
- a plurality of sensors configured to sense information relating to the target;
- a plurality of local trackers connected to the sensors, wherein each of the local trackers is configured to generate a local aimpoint and a local reliability value for the local aimpoint according to the sensed information from at least one sensor; and
- a combiner connected to the local trackers and configured to:
  - generate a global aimpoint according to the local aimpoints and the local reliability values; and
  - generate a global reliability value for each of the local aimpoints.

12. A missile according to claim 11, wherein the combiner is configured to substantially simultaneously process the local aimpoints to generate the global aimpoint.

13. A missile according to claim 11, wherein the combiner is configured to initialize at least one of the local trackers using the global aimpoint.

14. A missile according to claim 11, wherein:
- each global reliability value corresponds to a difference between the local aimpoint and a substantially contemporaneous global aimpoint; and
- the combiner is configured to attribute lower influence to the local aimpoint in generating the global aimpoint according to the magnitude of the difference.

15. A missile according to claim 11, wherein:
- each global reliability value corresponds to a difference between the local aimpoint and a substantially contemporaneous global aimpoint; and
- the combiner is configured to reset the local tracker if the corresponding difference exceeds a threshold.

16. A missile according to claim 11, wherein the combiner is configured to generate the global aimpoint based only on the local aimpoints, the local reliability values, and the global reliability values.

17. A missile according to claim 11, wherein at least one of the local trackers operates asynchronously with respect to at least one of the other local trackers.

18. A missile according to claim 11, wherein at least one of the local trackers uses a different coordinate system than at least one of the other local trackers.

19. A missile according to claim 11, wherein at least one of the local trackers uses a different reference axis than at least one of the other local trackers.

20. A missile according to claim 11, wherein:
- the combiner generates the global aimpoint according to the local aimpoints; and
- a weight attributed to each local aimpoint is based on the local reliability values.

21. A missile according to claim 19, wherein:
- the combiner is configured to generate a global reliability value for each of the local aimpoints; and
- the weight attributed to each local aimpoint is based on the local reliability values and the global reliability values for the local aimpoint.

22. A missile according to claim 21, wherein the global reliability value corresponds to a difference between the local aimpoint and a substantially contemporaneous global aimpoint.

23. A method for tracking a target, comprising:
- generating target position information using at least two sensors;
- generating a first local aimpoint for the target;
- generating a second local aimpoint for the target;
- generating a reliability value for the first local aimpoint, wherein the reliability value corresponds to a difference between the first local aimpoint and a substantially contemporaneous global aimpoint;
- generating a reliability value for the second local aimpoint wherein the reliability value corresponds to a difference between the second local aimpoint and a substantially contemporaneous global aimpoint;
- wherein the reliability values for the first and second local aimpoints comprise global reliability values;
- determining a weight for the first aimpoint according to the reliability value for the first aimpoint;

determining a weight for the second aimpoint according to the reliability value for the second aimpoint;

determining a global aimpoint according to the first and second local aimpoints and the weights for the first and second local aimpoints.

24. A method for tracking a target according to claim 23, wherein generating the first and second local aimpoints comprises sensing target data via a first sensor and a second sensor and analyzing the target data using a first local tracker and a second local tracker.

25. A method for tracking a target according to claim 23, wherein determining the global aimpoint comprises processing the first and second local aimpoints substantially concurrently.

26. A method for tracking a target according to claim 23, wherein the reliability values for the first and second local aimpoints comprise local reliability values.

27. A method for tracking a target according to claim 23, further comprising:

comparing the difference to a threshold; and re-initializing a local tracker if the difference exceeds the threshold.

28. A method for tracking a target according to claim 23, wherein:

the reliability value for the first local aimpoint comprises a first local reliability value and a first global reliability value; and the reliability value for the second local aimpoint comprises a second local reliability value and a second global reliability value.

29. A method for tracking a target according to claim 28, wherein:

determining the weight for the first aimpoint comprises determining the weight according to the first local reliability value and the first global reliability value; and determining the weight for the second aimpoint comprises determining the weight according to the second local reliability value and the second global reliability value.

30. A method for tracking a target according to claim 23, further comprising initializing a local tracker with the global aimpoint.

* * * * *